Sept. 7, 1937.  W. F. PUNTE  2,092,138
DISPENSING CONTAINER
Filed Oct. 24, 1935
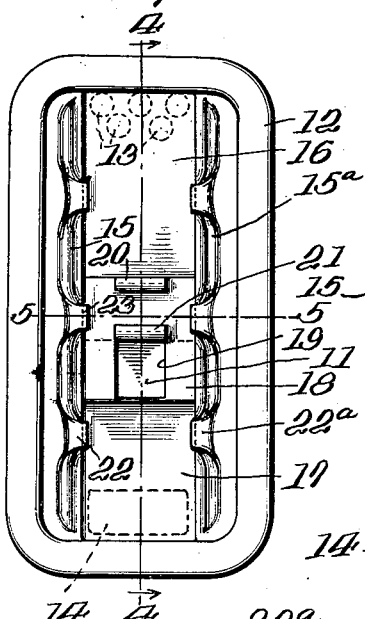
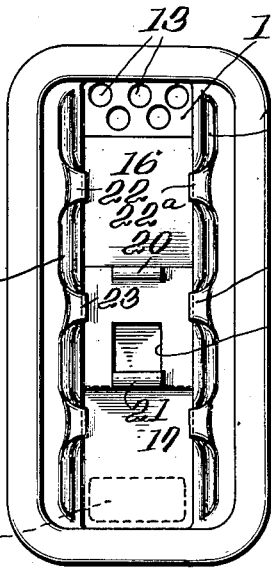
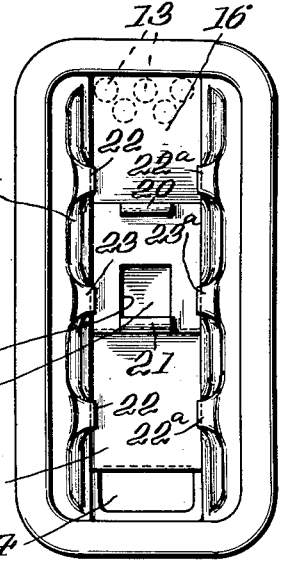
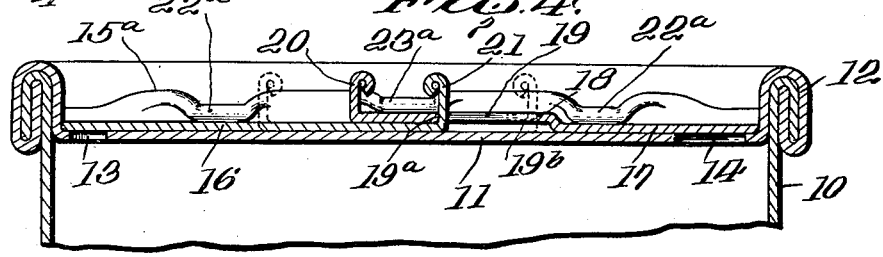
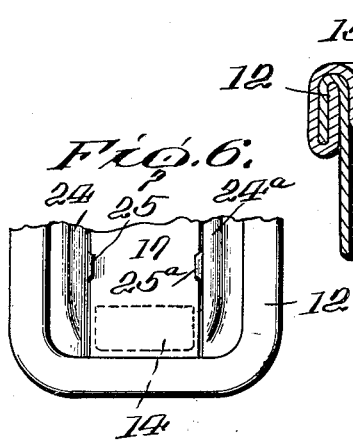
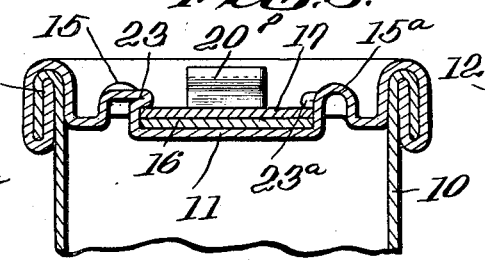
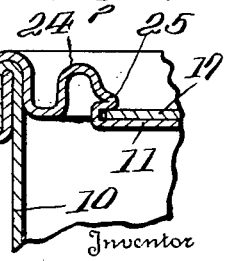
Inventor
William F. Punte
By Moore & Portis
Attorneys Patented Sept. 7, 1937

2,092,138

UNITED STATES PATENT OFFICE 2,092,138

DISPENSING CONTAINER

William F. Punte, Syracuse, N. Y., assignor to Continental Can Company, Inc., New York, N. Y., a corporation of New York Application October 24, 1935, Serial No. 46,611

6 Claims. (Cl. 221—62)

The present invention relates to new and useful improvements in dispensing containers and more particularly to a dispensing container from which the contents may be either poured or sifted.

An object of the invention is to provide a dispensing container of the above type wherein a pouring aperture and sifting apertures are each controlled by a separate closure member.

A further object of the invention is to provide a dispensing container of the above type wherein a pouring aperture and sifting apertures are separately controlled in a manner which permits only one of the dispensing apertures to be fully opened at a time.

A further object of the invention is to provide a dispensing container of the above type wherein a separate closure member for each aperture is provided and wherein the closure members are interconnected in a manner which prohibits the full opening of both dispensing apertures at the same time.

A still further object of the invention is to provide a dispensing container of the above type wherein a pouring opening and sifting openings are separately controlled in a manner which permits one of the dispensing openings to be simultaneously closed while the other is opened.

A still further object of the invention is to provide a dispensing container of the above type wherein a pair of closure members are provided for controlling the dispensing openings and wherein the closure members are interconnected in a manner which permits the said closure members to be moved in unison to close one of the dispensing openings and to open the other, or which permits the closure members to be moved separately.

The above and other objects of the invention will in part be obvious and will be hereinafter more fully set forth.

In the drawing:

Fig. 1 is a top plan view showing the container with the dispensing openings closed.

Fig. 2 is a top plan view showing the container with the sifting apertures opened.

Fig. 3 is a top plan view showing the pouring aperture opened.

Fig. 4 is a sectional view taken along the line 4—4 of Fig. 1.

Fig. 5 is a sectional view taken substantially along the line 5—5 of Fig. 1.

Fig. 6 is a fragmentary top plan showing a modified form of retaining means for the closure members.

Fig. 7 is a side view in section showing the same modification.

The invention relates generally to a dispensing container for holding pulverulent or granular material. The container is provided with dispensing apertures, one of which is a pouring opening for dispensing the contents in bulk, the others comprising a group of relatively small sifting openings permitting the contents to be sifted. These dispensing openings are separately controlled by a pair of closure members which are slidably mounted on the container end and the end portions of which are lapped and interconnected in a manner which permits both to be moved in unison to open one of the dispensing apertures while simultaneously closing the other, or which permits either one of the closure members to be moved separately.

Referring more in detail to the accompanying drawing, there is shown, for purposes of illustration, a rectangular container which includes a body portion 10 and an end member 11 double seamed thereto as at 12. The end member 11 is provided at one end thereof with a plurality of perforations 13 which form sifting openings through which the contents of the container may be dispensed. The opposite end of the member 11 is provided with a relatively large single opening 14 through which the contents of the container may be poured in bulk. A pair of ribs 15, 15a is struck up from the container end 11 during the formation thereof. These ribs are parallel to one another and run substantially the entire length of the container end.

A pair of closure members or slides 16 and 17 is mounted on the container end in alignment. The closure member 17 is provided with an offset portion 18 which overlies a portion of the closure member 16 which is flat throughout. The offset portion 18 is provided with a slot 19 and an upstanding handle portion 20 for operating the closure member 17. The closure member 16 is provided with an upstanding handle portion 21 which extends through the slot 19 in the closure member 17.

The sides of the closure members extend along the ribs 15, 15a. Portions 22, 22a on the ribs 15, 15a respectively, are bent over at intervals and depressed to overlie a portion of the sides of the closure members to thus form a retaining means or trackway in which they may slide. The bent portions 23, 23a at the center of the ribs 15, 15a respectively, are not depressed to the extent of the portions 22, 22a since, at this point, they must accommodate a double thickness of metal. This double thickness is due to the lapped portions of the closure members 16 and 17.

It will be noted that the handle portions 20 and 21 of the closure members 17 and 16, respectively, and the ribs 15, 15a on the can end 11 are all disposed entirely within and below the double seam 12 so that containers may be stacked one upon the other.

With the closure members in the position shown in Figs. 1 and 4, the sifting openings 13 and the pouring opening 14 are all closed. In this position, the handle 21 of the closure member 16 abuts against the inner edge 19a of the slot 19. With the closure members in the position shown in Fig. 2, it will be seen that the closure member 16 has been moved so as to expose the sifting openings 13 and, in this position, the handle 21 thereof abuts against the outer edge 19b of the slot 19. With the closure members in the position shown in Fig. 3, the closure member 16 covers the sifting openings 13 but the closure member 17 has been moved so as to expose the pouring opening 14. In this position, the handle 21 of the closure member 16 also abuts against the outer edge 19b of the slot 19.

When the closure members are in the position shown in Fig. 2, it will be seen that by grasping the handle 20 of the closure member 17 and moving the same toward the sifting openings 13, the closure member 16 will be moved to cover the sifting openings 13 and the closure member 17 will be moved to expose the pouring opening 14 because of the abutting relationship between the handle 21 of the closure member 16 and the outer edge 19b of the slot 19 in the closure member 17. This movement will therefore simultaneously open the pouring opening 14 and close the sifting openings 13 so that the closure members assume the position in Fig. 3. Similarly, when the closure members are in the position shown in Fig. 3, by grasping the handle portion 21 of the closure member 16 and moving the same toward the pouring opening 14, the closure member 17 will be shifted over the pouring opening 14 so as to close the same and the sifting openings 13 will be exposed. Then, too, the pouring opening 14 may be closed without opening the sifting openings 13 by grasping the handle 20 of the closure member 17 and forcing the same toward the pouring opening 14. When the closure members are in either of the positions shown in Figs. 2 or 3, it will be seen that by grasping both the handles 20, 21 and moving the same toward one another, all of the dispensing openings will be closed by their respective closure members.

In Figs. 6 and 7, there is shown a modified manner of retaining the closure members on the can end. A pair of ribs 24, 24a is struck up from the container end 11 during formation thereof and disposed parallel to one another, extending substantially the entire length of the container end. Instead of bending over portions of the ribs 24, 24a at intervals as described in connection with Figs. 1 to 5, the metal along the inner sides of the ribs 24, 24a is extruded at intervals to provide inwardly extending retaining lugs 25, 25a respectively. These retaining lugs are spaced from the container end 11 and extend inwardly to overlie the closure members 16, 17, thus forming a retaining means or trackway in which the closure members may slide.

It is to be clearly understood that minor changes in the details of construction and the arrangement of parts may be made without departing from the scope of the invention as set forth in the appended claims.

Having thus described my invention, what I claim as new and desire to secure by Letters Patent, is:

1. A dispensing container comprising a body portion, an end seamed thereto and having a pouring opening and a group of relatively small sifting openings, a pair of closure members one for said pouring opening and one for said sifting openings, means for slidably mounting said closure members on said end, said closure members having lapped portions, and means for interconnecting the lapped portions of said closure members whereby to permit them to be moved independently or in unison for controlling the dispensing openings.

2. A dispensing container comprising a body portion, an end seamed thereto and having a pouring opening and a group of relatively small sifting openings, a pair of closure members one for said pouring opening and one for said sifting openings, means for slidably mounting said closure members on said end, said closure members having lapped portions, one of said closure members having a longitudinal slot therethrough and the other of said closure members having a projection extending through said slot whereby said closure members may be moved independently or in unison for controlling the dispensing openings.

3. A dispensing container comprising a body portion, an end seamed thereto and having a pouring opening and a group of relatively small sifting openings, a pair of closure members one for each of said openings, means for slidably mounting said closure members on said end, one of said closure members having an offset portion overlying the other of said closure members, said offset portion having a slot therethrough, and upwardly projecting handle portions on each of said closure members, the handle portion on one of said closure members extending through said slot whereby to permit the closure members to be moved independently or in unison for controlling the dispensing openings.

4. A dispensing container comprising a body portion, an end seamed thereto and having a pouring opening and a group of relatively small sifting openings, closure members for said openings, one of said closure members having an offset portion overlying the other of said closure members, means for slidably mounting said closure members on said end and means interconnecting said offset portion with the other of said closure members to permit the same to slide in unison or independently.

5. A dispensing container comprising a body portion, an end seamed through and having a pouring opening and a group of relatively small sifting openings, a pair of closure members for separately controlling said openings and having lapped portions, a pair of parallel ribs on said end adjacent the side edges of said closure members, said ribs having portions thereof depressed and bent toward one another to overlie the edges of said closure members whereby to slidably secure the said closure members on said end, and means interconnecting the lapped portions of said closure members for permitting the same to be moved independently or in unison for controlling said dispensing openings.

6. A dispensing container as claimed in claim 5, wherein the inner edges of said ribs are forced inwardly at intervals to overlie the closure members.

WILLIAM F. PUNTE.